(12) United States Patent
Hanson et al.

(10) Patent No.: US 12,524,765 B2
(45) Date of Patent: *Jan. 13, 2026

(54) SYSTEM ARCHITECTURE FOR ENABLING DISTRIBUTED TEMPORARY CONTROL OF DISCRETE UNITS OF AN ASSET

(71) Applicant: Love The Block, Inc., Wilbraham, MA (US)

(72) Inventors: Glenn R. Hanson, Alton Bay, NH (US); David Kaufman, Northampton, MA (US); John Falcone, Longmeadow, MA (US)

(73) Assignee: Love The Block, Inc., Wilbraham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/737,676

(22) Filed: Jun. 7, 2024

(65) Prior Publication Data

US 2024/0320671 A1 Sep. 26, 2024

Related U.S. Application Data

(63) Continuation of application No. 17/419,237, filed as application No. PCT/US2019/068621 on Dec. 26, 2019, now Pat. No. 12,067,561.

(Continued)

(51) Int. Cl.
*G06Q 20/40* (2012.01)
*H04L 9/00* (2022.01)
*H04L 9/32* (2006.01)

(52) U.S. Cl.
CPC ......... *G06Q 20/401* (2013.01); *G06Q 20/405* (2013.01); *H04L 9/3239* (2013.01);

(Continued)

(58) Field of Classification Search
CPC .. G06Q 20/3674; G06Q 20/02; G06Q 20/389; G06Q 20/065; G06Q 20/363;

(Continued)

(56) References Cited

U.S. PATENT DOCUMENTS 11,108,566 B2 * 8/2021 Jacobs ................... G06Q 20/10
11,522,700 B1 * 12/2022 Auerbach ............. H04L 9/3213

(Continued)

FOREIGN PATENT DOCUMENTS

| CN | 109 003 078 | 12/2018 |
|---|---|---|
| JP | 2018 132794 | 8/2018 |

(Continued)

OTHER PUBLICATIONS

International Search Report and Written Opinion PCTUS2019068621 dated Apr. 30, 2020 in 6 pages.
EESR PCTUS2019068621 dated Aug. 23, 2022 in 8 pages.

*Primary Examiner* — Patrick McAtee
*Assistant Examiner* — Vincent I Idiake
(74) *Attorney, Agent, or Firm* — Knobbe, Martens, Olson & Bear, LLP

(57) ABSTRACT

Described herein are various embodiments of methods and systems for distributing temporary control of an asset. For example, a method can include receiving an indication of an execution of a transfer of temporary control between a granting entity and a receiving entity of a unit of an asset comprising a plurality of units. Transaction data comprising a duration of the temporary control of the unit can be received and recorded in a distributed ledger of a blockchain network. Logic and rules corresponding to conditions of transfer of the temporary control of the unit of the asset can be identified. The method can include receiving a granting (Continued)

entity authentication key and determining whether the transaction data meet the logic and the rules of the conditions of transfer.

16 Claims, 8 Drawing Sheets

Related U.S. Application Data

(60) Provisional application No. 62/785,924, filed on Dec. 28, 2018.

(52) U.S. Cl.
CPC ............ *G06Q 2220/00* (2013.01); *H04L 9/50* (2022.05); *H04L 2209/56* (2013.01)

(58) Field of Classification Search
CPC ............ G06Q 20/401; G06Q 20/405; G06Q 20/3678; G06Q 2220/00; G06Q 20/10; G06Q 20/08; H04L 9/3239; H04L 9/50; H04L 2209/56; H04L 9/088; H04L 63/0807
See application file for complete search history.

(56) References Cited

U.S. PATENT DOCUMENTS

| | | | |
|---|---|---|---|
| 11,625,783 B1 * | 4/2023 | Gordon, III | H04L 9/50 705/37 |
| 12,067,561 B2 | 8/2024 | Hanson et al. | |
| 2013/0080306 A1 * | 3/2013 | Hellman, Jr. | G06Q 50/16 705/35 |
| 2017/0243214 A1 | 8/2017 | Johnsrud et al. | |
| 2017/0244757 A1 | 8/2017 | Castinado et al. | |
| 2018/0268386 A1 * | 9/2018 | Wack | G06Q 20/02 |
| 2018/0285996 A1 | 10/2018 | Ma | |
| 2020/0059362 A1 * | 2/2020 | Brody | H04L 9/3242 |

FOREIGN PATENT DOCUMENTS

| | | |
|---|---|---|
| WO | WO-2017145007 A1 * | 8/2017 ............ G06Q 10/10 |
| WO | WO 2018/126075 | 7/2018 |
| WO | WO 2018/163044 | 9/2018 |
| WO | WO 2020/139980 | 7/2020 |

* cited by examiner

SYSTEM ARCHITECTURE FOR ENABLING DISTRIBUTED TEMPORARY CONTROL OF DISCRETE UNITS OF AN ASSET

CROSS-REFERENCE TO RELATED APPLICATIONS

This application is a continuation of U.S. application Ser. No. 17/419,237, filed Jun. 28, 2021, which claims benefit of the U.S. National Phase under 35 U.S.C. § 371 of International Application No. PCT/US2019/068621, filed Dec. 26, 2019, entitled "SYSTEM ARCHITECTURE FOR ENABLING DISTRIBUTED TEMPORARY CONTROL OF DISCRETE UNITS OF AN ASSET", which claims the benefit of priority under 35 U.S.C. § 119(e) to U.S. Provisional Application No. 62/785,924, filed on Dec. 28, 2018, entitled "SYSTEM ARCHITECTURE FOR ENABLING DISTRIBUTED TEMPORARY CONTROL OF DISCRETE UNITS OF AN ASSET," which are hereby incorporated by reference herein in their entireties.

BACKGROUND

Field

The present disclosure relates to blockchain technology, and more particularly to distributed temporary control of discrete units of an asset.

Description of the Related Art

Computer and network functionality for the transfer of control of assets is lacking, resulting in inefficiencies and functional limitations. Blockchain is a nascent technology for distributing individual features of a ledger to multiple entities. However, blockchain currently has considerable technological restrictions in its application, such as in how to release temporary control of an asset.

DETAILED DESCRIPTION

Figure 1A:
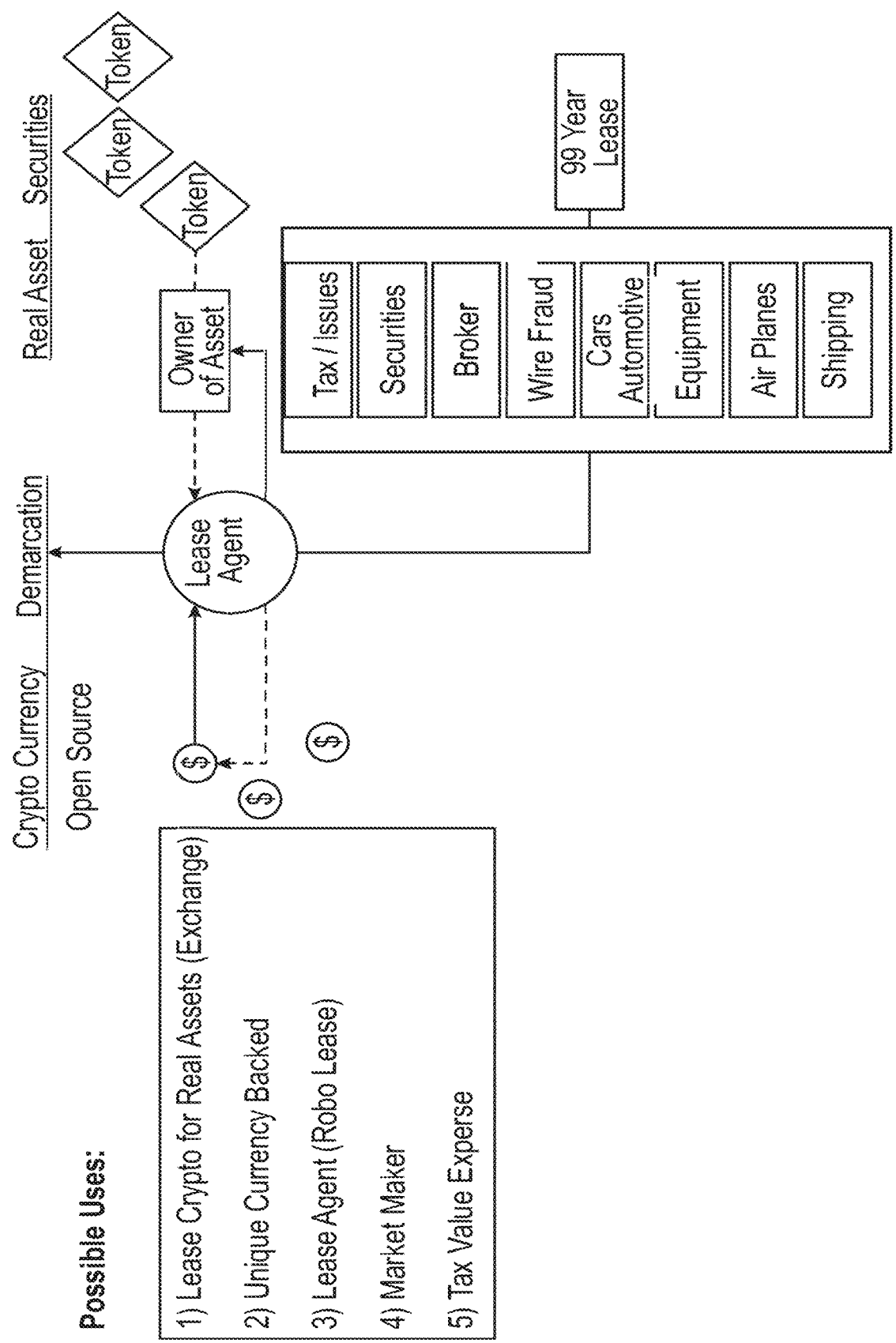
FIG. 1A schematically shows many advantages of various embodiments described herein.

Some of the embodiments herein relate to the inefficiencies of information transfer between a lessee and lessor. The idea is to utilize blockchain technology to quickly, accurately, and cost-effectively allow a lease to be executed or a person to invest any amount of money from almost any electronic device such as a smartphone app even while ordering a coffee or other activity. Seamlessly, the transaction can take place and comply with all securities laws.

One aspects of embodiments described herein is to modulate the real value of an asset in such a way that distribution (e.g., temporary control) of an asset can be handled quickly, accurately, and more simply. One unique feature of certain embodiments described herein is the ability to break into electronic components the underlying asset. The asset can be an intellectual asset or a real asset (e.g., real estate, airplanes, cars, businesses, etc.).

While information is transferred on the blockchain, it is safe and secure using its system of a decentralized ledger. However, the technology to offer secure temporary transactions (e.g., leases) while data and information is transferred from one blockchain to the next or between two individuals did not previously exist. As described herein, some embodiments provide the capability to securely, reliably, automatically, and/or instantaneously transfer, sign, and/or execute a lease between one entity (e.g., a person, corporation, etc.) and another entity. The lessor may be a granting entity and the lessee may be a receiving entity. One or more additional entities may be involved. For example, one or more entities may be signors of a smart contract (described in more detail below) and/or may serve as intermediaries between the lessor and the lessee.

Using blockchain or other decentralized storage and ledger system, an asset (e.g., real, intellectual) may be broken into smaller units. The units may be referred to as tokens, securities, crypto-units, or some other term. When tokenized, each unit of the asset can quickly and securely be transferred, and the value of a single token or multiple tokens can be translated directly into the value of a crypto currency. In some embodiments, two separate tokens may share value if they run on the same blockchain, on separate blockchains, and/or with one on a blockchain and one off the blockchain. Thus, a tokenized asset may be converted into a cryptocurrency that can be exchanged on an open marketplace. In this way, tokens (e.g., asset units that are individually leased, rented, owned, etc.) may be exchangeable in a marketplace and/or verified through a distributed ledger as described herein using, for example, blockchain technology.

A blockchain (or sometimes "block chain") is a distributed database that maintains a list of data records that improves security via the distributed nature of the blockchain. A blockchain typically includes several nodes, which may be one or more systems, machines, computers, databases, data stores or the like operably connected with one another. In some cases, each of the nodes or multiple nodes are maintained by different entities. A blockchain typically works without a central repository or single administrator. One wellknown application of a blockchain is the public ledger of transactions for cryptocurrencies. The data records recorded in the blockchain are enforced cryptographically and stored on the nodes of the blockchain.

A blockchain provides numerous advantages over traditional databases. A large number of nodes of a blockchain may reach a consensus regarding the validity of a transaction contained on the transaction ledger. The blockchain typically has two primary types of records. The first type is the transaction type, which consists of the actual data stored in the blockchain. The second type is the block type, which are records that confirm when and in what sequence certain transactions became recorded as part of the blockchain. Transactions are created by participants using the blockchain in its normal course of business (e.g., when someone sends cryptocurrency or, as described herein, tokenized assets to another person), and blocks are created by users known as "miners" who use specialized software/equipment to create blocks. The blockchain system may make known the number of miners in the current system and/or the system can comprise primary sponsors that generate and create the new blocks of the system. As such, any block may be worked on by a primary sponsor. Users of the blockchain create transactions that are passed around to various nodes of the blockchain. A "valid" transaction is one that can be validated based on a set of rules that are defined by the particular system implementing the blockchain. For example, in the case of cryptocurrencies, a valid transaction is one that is digitally signed, spent from a valid digital wallet and, in some cases, that meets other criteria. Similarly for tokens, a valid transaction may be one that is digitally signed and/or transferred from a digital wallet or other digital storage.

A blockchain is typically decentralized-meaning that a distributed ledger (e.g., a decentralized ledger) is maintained on multiple nodes of the blockchain. One node in the blockchain may have a complete or partial copy of the entire ledger or set of transactions and/or blocks on the blockchain. Transactions are initiated at a node of a blockchain and communicated to the various nodes of the blockchain. Any of the nodes can validate a transaction, add the transaction to its copy of the blockchain, and/or broadcast the transaction, its validation (in the form of a block) and/or other data to other nodes. This other data may include time-stamping, such as is used in cryptocurrency blockchains. In some embodiments, the nodes of the system might be financial institutions that function as gateways for other financial institutions. For example, a credit union (or other lender) might hold the account but provide access to the distributed system through a sponsor node.

Various other specific-purpose implementations of blockchains can be included, such as distributed domain name management, decentralized crowd-funding, leasing and/or other leasing transactions, synchronous/asynchronous communication, decentralized real-time ride sharing and even a general purpose deployment of decentralized applications. In some embodiments, a blockchain may be characterized as a public blockchain, a consortium blockchain, or a private blockchain. In this regard, the public blockchain is a blockchain that anyone in the world can read, anyone in the world can send transactions to and expect to see them included if they are valid, and anyone in the world can participate in the consensus process. The consensus process is a process for determining which of the blocks get added to the chain and what the current state of each block is. Typically, public blockchains are secured by crypto economics-the combination of economic incentives and cryptographic verification using mechanisms such as proof of work, following a general principle that the degree to which someone can have an influence in the consensus process is proportional to the quantity of economic resources that they can bring to bear. A public blockchain is generally considered to be fully decentralized.

In some embodiments, a consortium blockchain is a blockchain where the consensus process is controlled by a pre-selected set of nodes; for example, a blockchain may be associated with a number of member institutions (e.g., 2, 10, 15, etc.), each of which operate in such a way that the at least a certain number (e.g., 2, 5, 10, 25, etc.) of members must sign every block in order for the block to be valid. The right to read such a blockchain may be public, or restricted to the participants. These blockchains may be considered partially decentralized. In still other embodiments, fully private blockchains is a blockchain whereby permissions are kept centralized with one entity. The permissions may be public or restricted to an arbitrary extent.

In some embodiments, inefficiencies and technical problems associated with leases are solved. Traditional leases generally involve often repetitive paperwork, lengthy credit checks, and time-consuming requests and processes. By contrast, when assets (e.g., real assets) are tokenized, they can travel in the form of a token off the blockchain into a cryptocurrency on another and/or the same blockchain. This allows the value of the real asset to be directly related to the value of a token or vice versa. "Tokenization" generally refers to the process of replacing sensitive data with unique identifiers (e.g., identification symbols) that retain the required information about the data without compromising its security. An issuer of a token can be an asset owner, a bank, or another party responsible for the asset to be tokenized.

After "tokenizing" the asset the system can modulate the flow of tokens through the "lease agent" making the token instantly available to the would-be "purchaser/lessor". The ability to manage this process is one of the technological advances unique to this process. The technology can allow a person to invest any amount of money from almost any electronic device such as a smartphone app even while ordering a coffee or other activity. The transaction can offer a smooth user experience while meeting security requirements for countries around the globe.

In certain embodiments, "smart contracts" may be used. Smart contracts may be uniquely keyed to a token and can be used to manage tiers of opportunity at the same time protecting investment. Smart contracts can be arranged in such a way as to allow transparency never seen before, particularly in leasing transactions. Blockchains reduce the amount of trust required from any single actor in the system. Due to the usage of a decentralized consensus algorithm "trustless trust" can be achieved, resulting in a distributed database that is tamperproof. Trusted data elements are distributed among disparate actors in the system, and via an economic game having rules described below, the disparate actors cooperate according to the rules. This can be done via unique coding of algorithms locking in a security via identifier "tags" that may follow each purchaser for a specified time period or possibly forever. Certain embodiments may include an insurance mechanism to provide protection to the user in the event of a hack, delay in transmission, and/or fraud. The protection can stem from the blockchain technology with one or more levels of security verification. For example, each recipient of a lease contract may hold a unique key that ensures their lease agreement holds title to the specific token that is tied to the underlying asset. Thus, the lessor and lessee can be better assured that there will not be any errors. This system of technology, process, and unbridled access will categorically change the way many assets are financed while giving financial access to those who otherwise would not be given permission. This technological advancement is the first cryptocurrency backed by real assets thereby creating an enormous economy of its own for the benefit of people around the world.

The system may aggregate information associated with past transactions executed two or more entities (e.g., a granting entity such as a lessor, a receiving entity such as an agent entity or a lessee). In doing so the system may be configured to create a blockchain of transaction information based on at least the aggregated information associated with the transactions. Additionally or alternatively, the system may initiate a request to receive information associated with transaction activity executed by the entity with one or more nodes.

The system may be configured to transmit a request to the one or more nodes to validate the transaction activity based on at least logic and rules for the blockchain (e.g., elements of a leasing or renting arrangement). In some embodiments, the validation step may be performed by the granting entity prior to adding the transaction information to the blockchain based on the logic and rules from the granting entity's distributed ledger. The granting entity can post the validated transaction information record to the blockchain with an authentication key or signature that is recognized by other members of the blockchain. In some embodiments, the validation may also be performed by one or more of the member financial institutions other than the granting entity. For example, in a blockchain certain institutions may be designated as validation institutions that in addition to being potential source and/or host institutions operate as validation institutions for all members of the blockchain. In such an arrangement, the transaction information record of the granting entity (e.g., the entity that owns the asset and/or a financial institution through which the transaction was originally made with the entity) can be first sent by the granting entity to the validating entity (e.g., a separate financial institution and/or one or more nodes) and the request is validated using information provided with the request to the validation entity based on the logic and rules from the blockchain's distributed ledger. The validated transaction information record may then be posted to the blockchain by the validation institution with a signature or authentication key indicating that the transaction is validated. In other embodiments, the transaction information record is first sent by the granting entity to the validation institution, and the request is validated based on information provided with the transaction information record at the validation institution. The validation institution may transmit the signature or authentication key to the granting entity, and the granting entity may post the validated transaction information record to the blockchain. In some embodiments the validation institutions may comprise an entity that is not a member financial institution and that does not function as a host or granting entity. In such an embodiment the validation institution may not be permitted to access, maintain or control any user transaction information records and only functions to validate the transaction information record. Once the transaction information record is validated the validation institutions may provide an authentication key or signature to the granting entity that is used by the granting entity to post the validated device record to the blockchain.

As described herein, the blockchain may be configured with a set of rules to dictate when and how transactions are valid and other details about how the network communicates data and the like (e.g., parties of the transaction, duration of the rental/lease agreement, terms of the arrangement, etc.). In some embodiments, the rules dictate that a granting entity must validate all transaction information records. In some embodiments, the rules dictate that some or all transaction information records may be approved by one or more validation institutions. A validation institution may be one or more of the financial institutions on the blockchain that validate transactions for other financial institutions on the blockchain. In some such cases, the rules dictate that the transaction information record created by a granting entity, also includes additional information that is useful in determining whether requests associated with the transaction information record should be approved. In other embodiments, the validation institution must reach out to the host institution in certain situations as dictated by the rules. In some embodiments, more than one institution must validate a transaction before it may be posted to the blockchain as a validated transaction information record. In some implementations, blockchains are not suitable for storing large amounts of data, so additional information can be stored in external (off-chain systems) and being validated via fingerprints/hashes that get stored inside a blockchain. For example, certain data, such as descriptive details of the asset itself or of the issuer of the token, may be stored outside the blockchain such that those details can be validated independently of the tokenized assets.

As noted above, certain embodiments may tokenize or divide into fractional pieces each asset such that each token or piece represents a piece of an asset. Assets may also be tokenized as one single token. These tokens can include information on the share of the asset they represent, which can then be leased to others who are willing to hold them (e.g., possess them, control them) without actually owning the token. In some embodiments, the tokens may automatically revert back to the grantor after a specified time period (e.g., at the end of the lease). This may occur, for example, programmatically by the smart contract holding the tokens implementing a rule that sends tokens to a particular address as soon as a current date exceeds an end date of the lease. The holder can benefit from the token just as they would if they entered into a lease agreement. A lease agent may serve as an intermediary between the token and the crypto currency and/or may be part of a smart contract or similar logical conditioning used to transfer the asset from a token to a crypto currency. Thus, the lease agent can act as the intermediary, leasing tokens from the owner and to those who want the benefits of possession or control of the tokens. The value of any token can be determined by inputs received on one end of the lease agent. This data entered is then transmitted through the lease agent which then directly correlate value with the cryptocurrency or fiat currency on the other end. In certain embodiments, an entity can tokenize the units to create a commodity structure around the units. For example, the units of the asset or assets could serve as collateral for a security interest in a good or cash flow. The commodity structure enables users to categorize items, services, and supplier branch information in a hierarchical tree structure.

The units or tokens could include a provision (e.g., in a "smart contract" or other logical condition) where the lender assumes temporary control of the goods with a sale/buy back arrangement. Thus, a commodity structure in conjunction with the tokens can be used as a financing solution for a large asset or a group of assets.

In some embodiments, a lease-to-own capability can be provided. For example, at the end of the lease period, the token may remain in the possession and/or control of the recipient while the title to the tokenized asset is also (e.g., automatically) transferred to the recipient to complete the ownership transaction. In some embodiments, one or more inputs related to lease-to-own provision may be collected in one set of logical conditions (e.g., in a smart contract). As noted, blockchain technology can allow for this transaction to be automatically and/or securely executed (e.g., transferred) among two or more parties. In some embodiments, the transaction can be executed on behalf of a single party.

Specific reference will now be made to the Figures. FIG. 1A schematically shows many advantages of the various embodiments described herein. For example, it can provide a reduction in repetitive work, automatically update the value of the token, it can be used in place of virtually all types of traditional lease arrangements, it can be used to convert real assets into a digital currency such as a crypto currency or fiat currency, the asset can be backed the digital currency and/or digital token, and transactions can be more secure than traditional deals. Other advantages are shown, such as a reduction in wire fraud and/or the possible elimination of intermediate parties on an asset transaction.

In certain embodiments, a policy contract (e.g., life insurance policy) can be tokenized as described herein. The tokenized policy contract can include a plurality of units that can be distributed to one or more owners for temporary control of the corresponding units. For example, a life insurance policy including the transfer of regular payments may be tokenized, and each token may be temporarily distributed to different lessees. Each token may include a smart contract that includes logic for transferring a payment to the lessor as well as for receiving and/or demanding a payment from a policy provider (e.g., insurance provider).

Figure 1B:
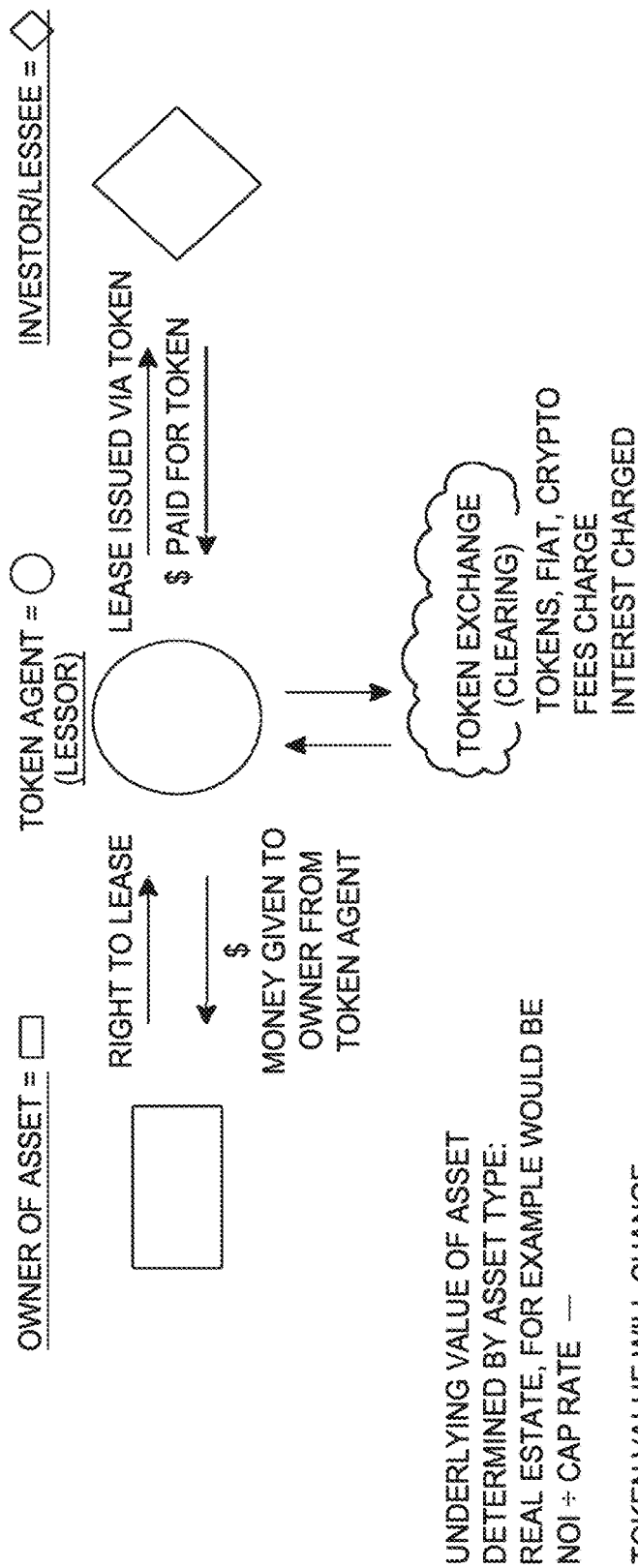
FIG. 1B shows additional features of certain embodiments described herein.

The payment may correspond in size to a total payment of the policy divided by the total tokens associated with the policy contract. FIG. 1B shows additional features of certain embodiments described herein.

Figure 2:
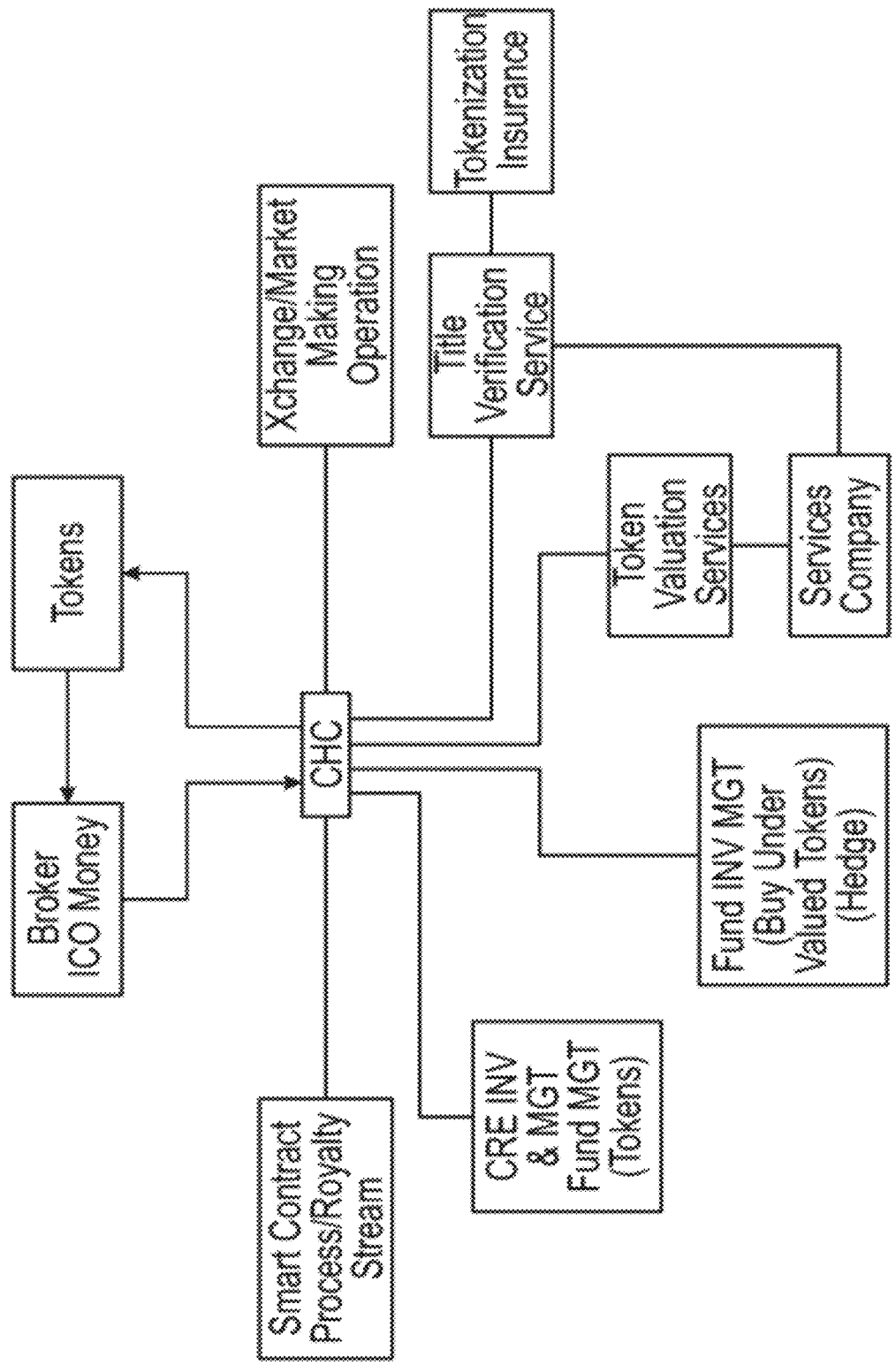
FIG. 2 shows example entities that may be involved in an example blockchain lease transaction.

FIG. 2 shows example entities that may be involved in an example blockchain lease transaction. As shown, a central agency or broker may be used to receive funds for the smart contract, submit information in the blockchain ledger to allow for distributed verification of the asset transaction, pass/receive tokens for crypto currency, distribute tokens and/or crypto currency to one or more fund managers, provide a valuation of the token and/or crypto currency, verify certain aspects of title (if this is not provided by the blockchain itself), and/or provide an insurance for fraudulent transactions.

Figure 3:
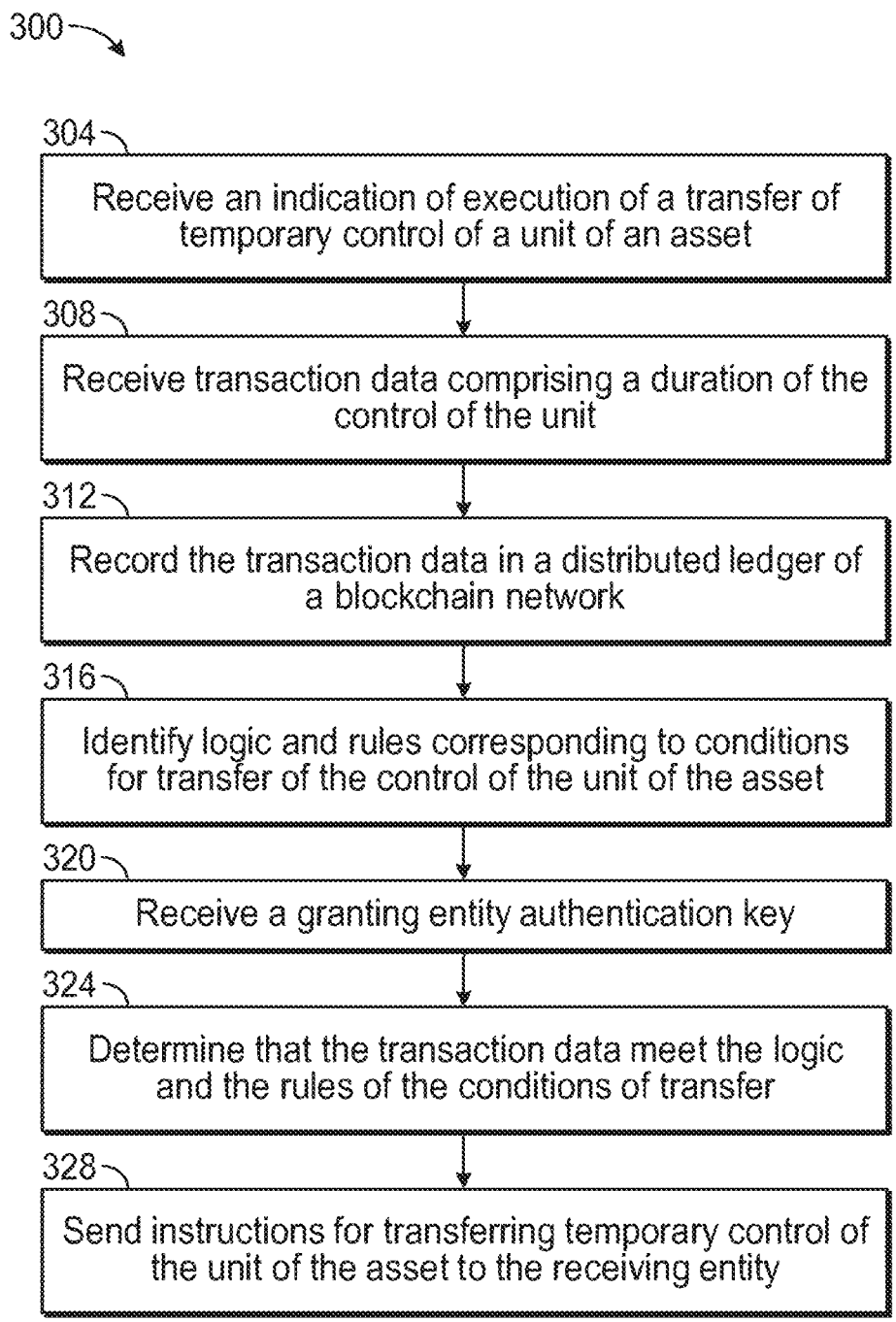
FIG. 3 shows an example method that can, for example, be implemented on a computer, according to some embodiments.

FIG. 3 shows an example method 300 that can, for example, be implemented on a computer, according to some embodiments. The method can enable distributed control of discrete units of an asset based on a distributed blockchain network as described herein. At block 304, the method can include receiving an indication of an execution of a transfer of temporary control between a granting entity and a receiving entity of a unit of an asset comprising a plurality of units. For example, receiving the indication may be triggered by the corresponding blockchain transaction being confirmed/mined. This may also be the technical trigger to update any type of GUI or sending out an email. In some implementations, the indication may include a sensory signal, such as a flash or a sound. At block 308, the method may include receiving transaction data comprising a duration of time of the control of the unit. The duration may include a specific time (e.g., 1 day, 1 month, 6 months, 1 year, 5 years, 99 years, etc.) and/or a condition for concluding the lease. A condition can include the fulfilment of a certain event (e.g., an accumulation of a certain number of tokenized assets) or a failure of a triggering event (e.g., a failure to transfer funds by a particular date to a granting entity). Multiple conditions and/or durations may be included. For example, the duration may include the first condition or time period to be fulfilled. Other conditions are possible. At the conclusion of the duration and/or conditions, the units can be returned or reverted back to the granting entity, perhaps at a cost and/or value increase or reduction.

The method can include determining that the receiving entity has initiated the transaction. However, in certain embodiments, the method may include determining that the granting entity has initiated the transaction. In certain embodiments, no such determination is made. At block 312, the method can include recording (e.g., based at least on the determination described above) the transaction data in a distributed ledger of a blockchain network. The transaction data may be part of a long list of data from various transactions that may have occurred prior to the present transaction. The method can identify a smart contract between the granting entity and at least the receiving entity. The smart contract may be between the granting entity and a plurality of entities. The smart contract can include logic and rules corresponding to conditions for transfer of the control of the unit of the asset. In certain embodiments, a smart contract is not employed but conditional logic is used to ensure successful fulfillment of the logic and/or rules associated with the asset unit.

At block 316, the method can identify the logic and rules of the smart contract and/or other conditions for transfer of control of the unit of asset. At block 320, the method may include receiving a granting entity authentication key. The granting entity authentication key can ensure that the transaction is taking place with the permission of the granting entity and on the permitted terms. A centralized entity or broker (e.g., as described herein) may receive the granting entity authentication key.

At block 324, the method may determine that the transaction data meet the logic and rules of the logic and rules of the conditions of transfer (e.g., of the smart contract) by at least, for example, comparing the transaction data to the logic and rules of the smart contract and/or matching (e.g., based on the comparison) a stored authentication key of the blockchain distributed network to the granting entity authentication key. Based on the determination that the transaction data meet the logic and rules of the smart contract, the method can validate the transaction data. This validation may include verifying that the correct parties are involved in the transaction, that the correct terms are included for the transaction, that the conditions of the transaction are met, and/or that the existence of the asset and payment are confirmed. Such verification can include implementing Know Your Customer ("KYC") or Anti-Money Laundering ("AML") algorithms. KYC can include verifying a user's identity or verifying other credentials involved in the transaction. AML can include preventing the ability of tokens to be used in financial crimes.

At block 328, the method can send (e.g., based on the validation of the transaction data) instructions for transferring temporary control of the unit of the asset to the receiving entity. Sending instructions for transferring temporary control of the unit of the asset to the receiving entity can include sending instructions for transferring an exchange asset from the receiving entity to the granting entity. Sending the instructions for transferring temporary control of the unit of the asset can include forming a new smart contract between the receiving entity and at least the granting entity. The new smart contract can include corresponding new rules and new logic. The new logic may include instructions to transfer a payment asset (e.g., a tokenized money payment) and/or the unit of the asset to the granting entity based on a passage of a period of time. In some embodiments, the new instructions can include instructions for transferring corresponding plurality of payment assets to the granting entity such that the transfer of each of the plurality of payment assets is to occur after passage of each of the corresponding plurality of periods of time. The new logic can include instructions to transfer, based on a change in value of the unit of the asset, a payment asset to the receiving entity. The new logic can include instructions to transfer, based on a passage of the duration of time, control of the unit of the asset to the granting entity. In some embodiments, the instructions may include transferring the control by a centralized broker described herein. Transferring control can require a "multi-sig-solution" where a plurality of entities would need to verify the transaction (e.g., via a signature) before the transaction is valid (e.g., 2 out of 3 users in predefined roles). After validation, the system may require a change in entities that need to approve the transaction, such as a new entity altogether (e.g., now 3 out of 4 users).

Figure 4:
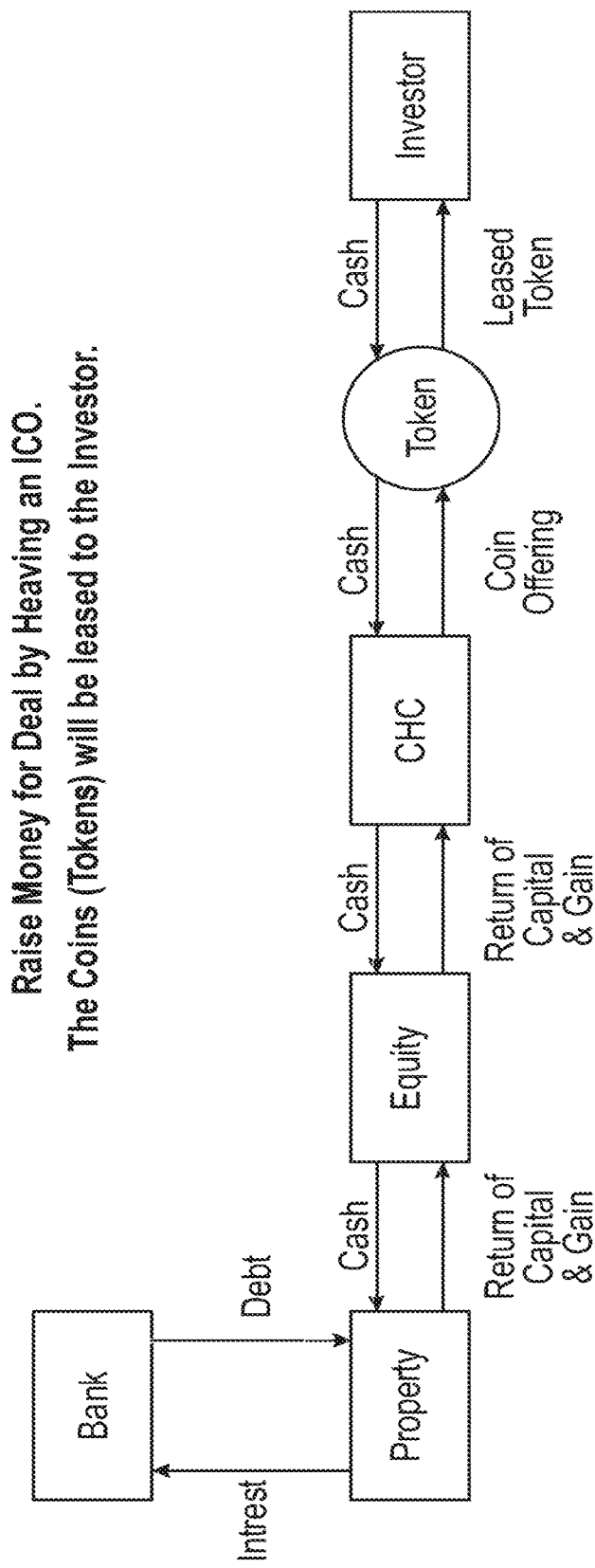
FIG. 4 shows an example embodiment of tokenizing and leasing an asset, according to some embodiments.

FIG. 4 shows an example embodiment of tokenizing and leasing an asset, according to some embodiments. As shown, a lending organization (e.g., a bank) may provide debt to a property owner in exchange for interest on the debt. The property owner may transfer ownership and control of the property (e.g., real asset) to an equity holder in exchange for payment. A central broker entity may provide the equity holder a payment in exchange for a capital gain on the equity. The equity of the asset can be turned into one or more tokens (e.g., as described herein) that can be exchanged for payment. These one or more tokens can be leased (e.g., using blockchain as described herein) for payment by an investor.

Figure 5:
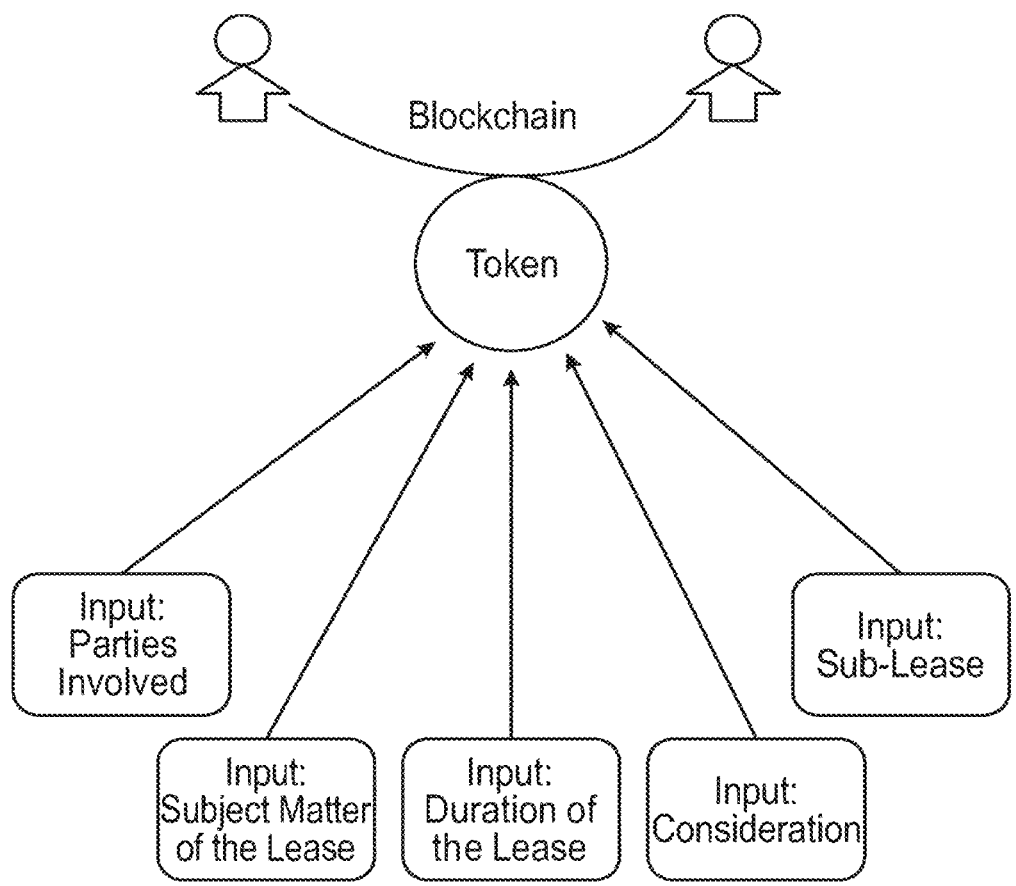
FIG. 5 shows various inputs that may be included in a blockchain lease of a token of an asset, according to some embodiments.

FIG. 5 shows various inputs that may be included in a blockchain lease of a token of an asset, according to some embodiments. In some embodiments, these inputs may be included in the conditions of transfer (e.g., a smart contract) described herein. For example, inputs may include the identity of one or more parties that are involved, subject matter of the lease, duration of the lease, consideration for the leased token, and/or terms of a sub-lease of the token. As shown, one or more of these terms may be verified by the blockchain ledger. For example, in some implementations these terms may be verified by the miners. For example, the rules and data within the smart contracts that are being executed by the miners do the verification and rule checking. In some implementations, the token smart contracts include additional data field to store rules concerning allowed parties and terms allowed, along with "standard" extensions for KYC/AML information that may be part of the token contracts as well.

Figure 6:
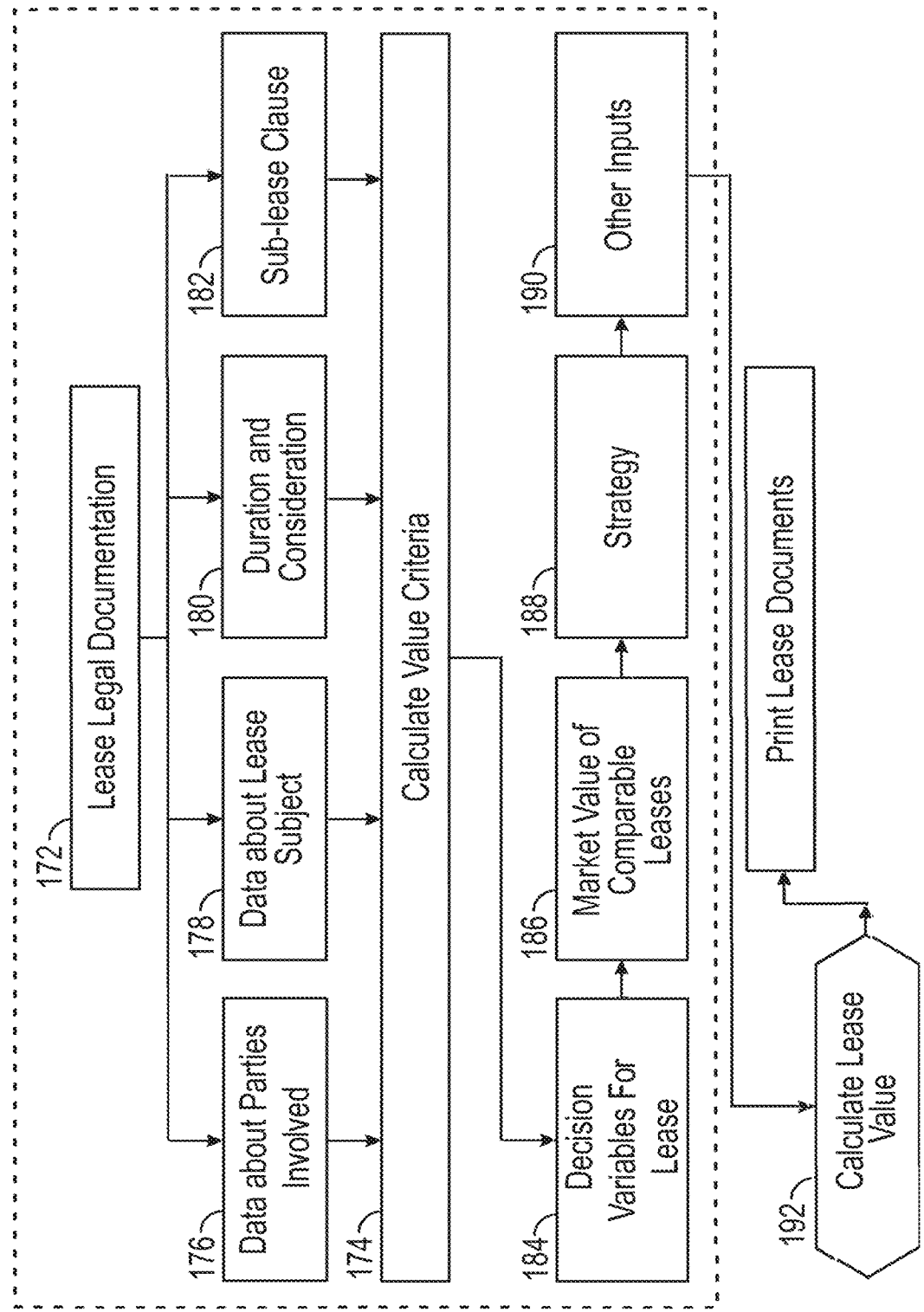
FIG. 6 shows an example database model of transactions and/or conditions within a lease for valuing the asset, according to some embodiments.

FIG. 6 shows an example flowchart of transactions and/or conditions within a lease for valuing the asset, according to some embodiments. A due diligence review of the data object (e.g., lease legal documentation) 172 can be performed. The database model may include various inputs, such as data about data object (e.g., involved parties) 176, data object (e.g., data about lease subject) 178, data object (e.g., duration and consideration) 180, and/or data object (e.g., sub-lease clause(s)) 182 for each token.

One or more elements of this data may be used to calculate value criteria in step 174 for valuing each tokenized asset. Various decision variables may be included such as decision variables for the lease 184, market value of comparable leases 186, a strategy 188 for tokenizing the asset, and various other inputs 190. A value is then calculated for each token in step 192. Thereafter, the least documents may be printed 194 if necessary and any other appropriate reports.

Additional Implementation Details

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence or time, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 7:
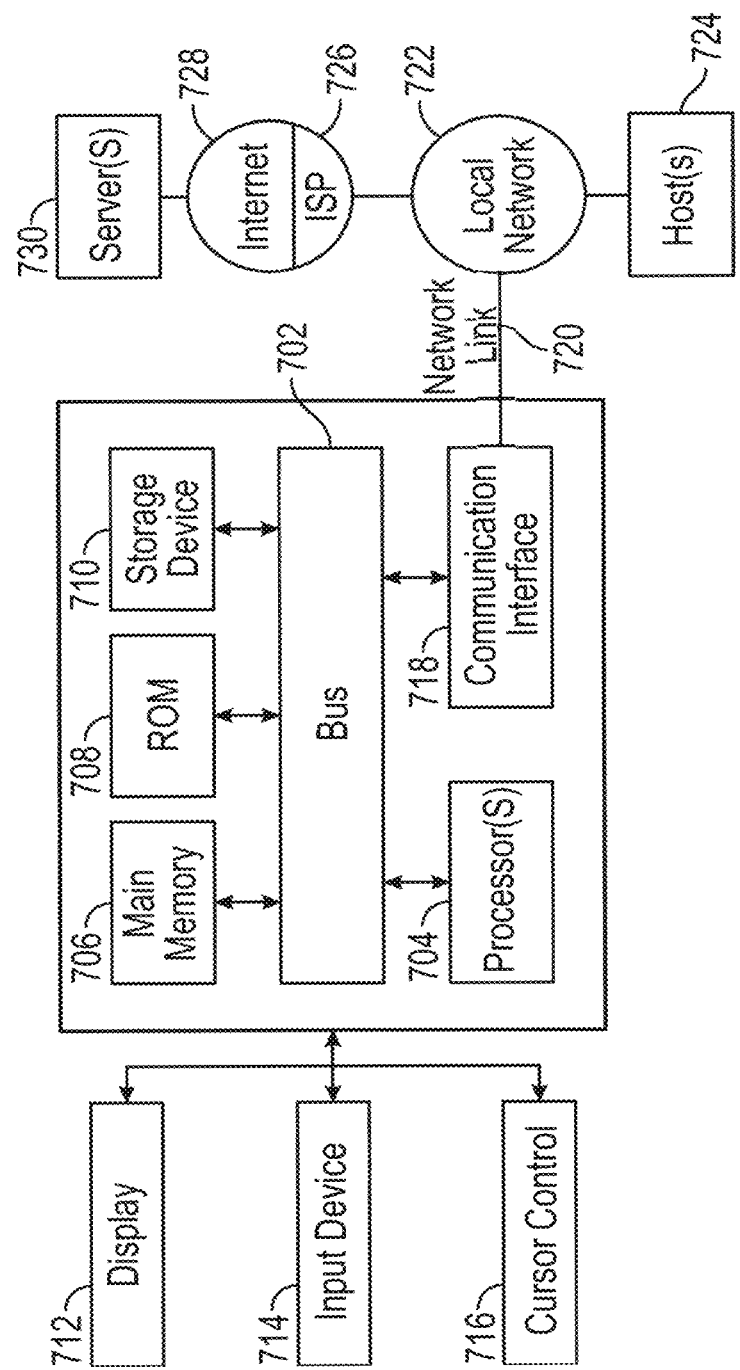
FIG. 7 is a block diagram that illustrates a computer system upon which various embodiments may be implemented.

For example, FIG. 7 is a block diagram that illustrates a computer system 700 upon which various embodiments may be implemented. Computer system 700 includes a bus 702 or other communication mechanism for communicating information, and a hardware processor, or multiple processors, 704 coupled with bus 702 for processing information. Hardware processor(s) 704 may be, for example, one or more general purpose microprocessors.

Computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

Computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 700 may include a user interface module to implement a GUI that may be stored in a mass storage device as computer executable program instructions that are executed by the computing device(s). Computer system 700 may further, as described below, implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more computer readable program instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

Various forms of computer readable storage media may be involved in carrying one or more sequences of one or more computer readable program instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "realtime" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computing system configured to enable distributed control of discrete units of an asset based on a distributed blockchain network, the computing system comprising:
   a computer readable storage medium having program instructions embodied therewith; and
   one or more processors configured to execute the program instructions to cause the computing system to:
   receive an indication of a transaction involving transfer of control between a granting entity and a receiving entity of a unit of an asset comprising a plurality of units, each unit comprising a fractional piece of the asset;
   generate a token corresponding to the fractional piece of the asset, the token comprising unique identifiers associated with the fractional piece of the asset and with the receiving entity, wherein the token is transferrable off a blockchain network into a cryptocurrency or fiat currency;
   determine that the transaction meets predefined criteria by:
      comparing the transaction to a set of logic and rules; and
      based on the comparison, matching a stored authentication key of the blockchain network to an authentication key associated with the granting entity;
   validate the transaction, wherein the authentication key and the stored authentication key of the blockchain network are used to provide enhanced security and anonymity in the control of tokenized units of the asset;
   determine a duration of control for the unit of the asset based at least on a duration value included in the received indication of the transaction; and
   in response to detecting expiration of the duration of control of the unit, initiate transfer of control of the unit of the asset back to the granting entity.

2. The computing system of claim 1, wherein the program instructions further cause the computing system to:
   initiate a smart contract between the granting entity and the receiving entity, the smart contract comprising the logic and rules for the transfer of control of the unit of the asset.

3. The computing system of claim 2, wherein the smart contract includes conditions for the transfer of control of the unit of the asset, the conditions comprising at least one of the duration of control, a specific event, or a failure of a triggering event.

4. The computing system of claim 3, wherein the program instructions further cause the computing system to:
   receive transaction data comprising a duration of time for the control of the unit of the asset, the duration of time being specified in the smart contract.

5. The computing system of claim 1, wherein the program instructions further cause the computing system to:
transmit a request to one or more nodes of the blockchain network to validate the transaction based on the logic and rules of the blockchain network.

6. The computing system of claim 1, wherein the program instructions further cause the computing system to:
receive a granting entity authentication key from the granting entity, the granting entity authentication key being used to validate the transaction.

7. The computing system of claim 1, wherein the program instructions further cause the computing system to:
generate a new token corresponding to the fractional piece of the asset, the new token comprising updated unique identifiers associated with the fractional piece of the asset and with a new receiving entity.

8. The computing system of claim 1, wherein the program instructions further cause the computing system to:
initiate a transfer of a payment asset from the receiving entity to the granting entity based on passage of a period of time specified in a smart contract.

9. The computing system of claim 1, wherein the program instructions further cause the computing system to:
implement Know Your Customer (KYC) and Anti-Money Laundering (AML) algorithms to verify identities of the granting entity and the receiving entity.

10. The computing system of claim 1, wherein the program instructions further cause the computing system to:
store additional information related to the asset in an external off-chain system, the additional information being validated via fingerprints or hashes stored inside the blockchain network.

11. The computing system of claim 1, wherein the program instructions further cause the computing system to:
initiate a lease-to-own transaction, wherein the control of the unit of the asset is transferred to the receiving entity, and title to the tokenized asset is automatically transferred to the receiving entity at the end of the lease period.

12. The computing system of claim 1, wherein the program instructions further cause the computing system to:
aggregate information associated with past transactions executed by two or more entities to create a blockchain of transaction information based on the aggregated information.

13. The computing system of claim 1, wherein the program instructions further cause the computing system to:
initiate a request to receive information associated with transaction activity executed by the entity with one or more nodes of the blockchain network.

14. The computing system of claim 1, wherein the program instructions further cause the computing system to:
transmit instructions for transferring temporary control of the unit of the asset to the receiving entity, the instructions including forming a new smart contract between the receiving entity and the granting entity.

15. The computing system of claim 1, wherein the program instructions further cause the computing system to:
determine that the transaction meets the logic and rules of a smart contract by comparing transaction data to the logic and rules and matching a stored authentication key of the blockchain distributed network to the granting entity authentication key.

16. A computer-implemented method for enabling distributed control of discrete units of an asset based on a distributed blockchain network, the method comprising:
receiving an indication of a transaction involving transfer of control between a granting entity and a receiving entity of a unit of an asset comprising a plurality of units, each unit comprising a fractional piece of the asset;
generating a token corresponding to the fractional piece of the asset, the token comprising unique identifiers associated with the fractional piece of the asset and with the receiving entity, wherein the token is transferrable off a blockchain network into a cryptocurrency or fiat currency;
determining that the transaction meets predefined criteria by:
comparing the transaction to a set of logic and rules; and
based on the comparison, matching a stored authentication key of the blockchain network to an authentication key associated with the granting entity;
validating the transaction, wherein the authentication key and the stored authentication key of the blockchain network are used to provide enhanced security and anonymity in the control of tokenized units of the asset;
recording the transaction in a distributed ledger of the blockchain network;
determining a duration of control for the unit of the asset based at least on a duration value or event-based termination condition indicated by the smart contract; and
in response to detecting expiration of the duration of control of the unit, initiating transfer of control of the unit of the asset back to the granting entity.

* * * * *